Aug. 25, 1931.  C. WILLIAMS  1,820,418
MOTION PICTURE MACHINE
Filed Jan. 29, 1929  4 Sheets-Sheet 1

INVENTOR.
CLAYTON WILLIAMS.
BY
ATTORNEYS.

Aug. 25, 1931.  C. WILLIAMS  1,820,418
MOTION PICTURE MACHINE
Filed Jan. 29, 1929   4 Sheets-Sheet 2

INVENTOR.
CLAYTON WILLIAMS,
BY
ATTORNEYS.

Aug. 25, 1931.    C. WILLIAMS    1,820,418
MOTION PICTURE MACHINE
Filed Jan. 29, 1929    4 Sheets-Sheet 3

INVENTOR.
CLAYTON WILLIAMS.
BY
ATTORNEYS.

Patented Aug. 25, 1931

1,820,418

UNITED STATES PATENT OFFICE

CLAYTON WILLIAMS, OF CAMDEN, NEW JERSEY

MOTION PICTURE MACHINE

Application filed January 29, 1929. Serial No. 335,873.

My invention relates to a new and useful motion picture machine and more particularly to a novel construction adapted for photographing a given object from two different angles in the same horizontal plane or in different planes, if so desired, so that when the photographs are projected in rapid succession in the usual manner, a "relief" or "perspective" effect is produced to impart to the object seen an appearance of reality or solidarity.

With this object in view, my invention consists of a novel motion picture machine or camera including a casing, a novel optical chamber construction for making exposures, adapted to oscillate or reciprocate within said casing, preferably in a horizontal plane from left to right or vice versa, and a lens carried by said optical chamber and adapted to reciprocate therewith, said casing being also adapted to carry and reciprocate the film being exposed simultaneously and in focal registration with said lens.

My invention further consists of means for reciprocating said lens and film as a unit along a circuitous path, that is, upon an arc of a circle to accentuate the angular difference, means for momentarily retaining said lens and film in either of their extreme positions to permit exposure, and means for preventing exposure of said film except when the latter is in one or the other of said extreme positions.

My invention further consists of various other novel features of construction and advantage all as will be hereinafter described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:—

Similar numerals of reference indicate corresponding parts.

Figures 1, 9:
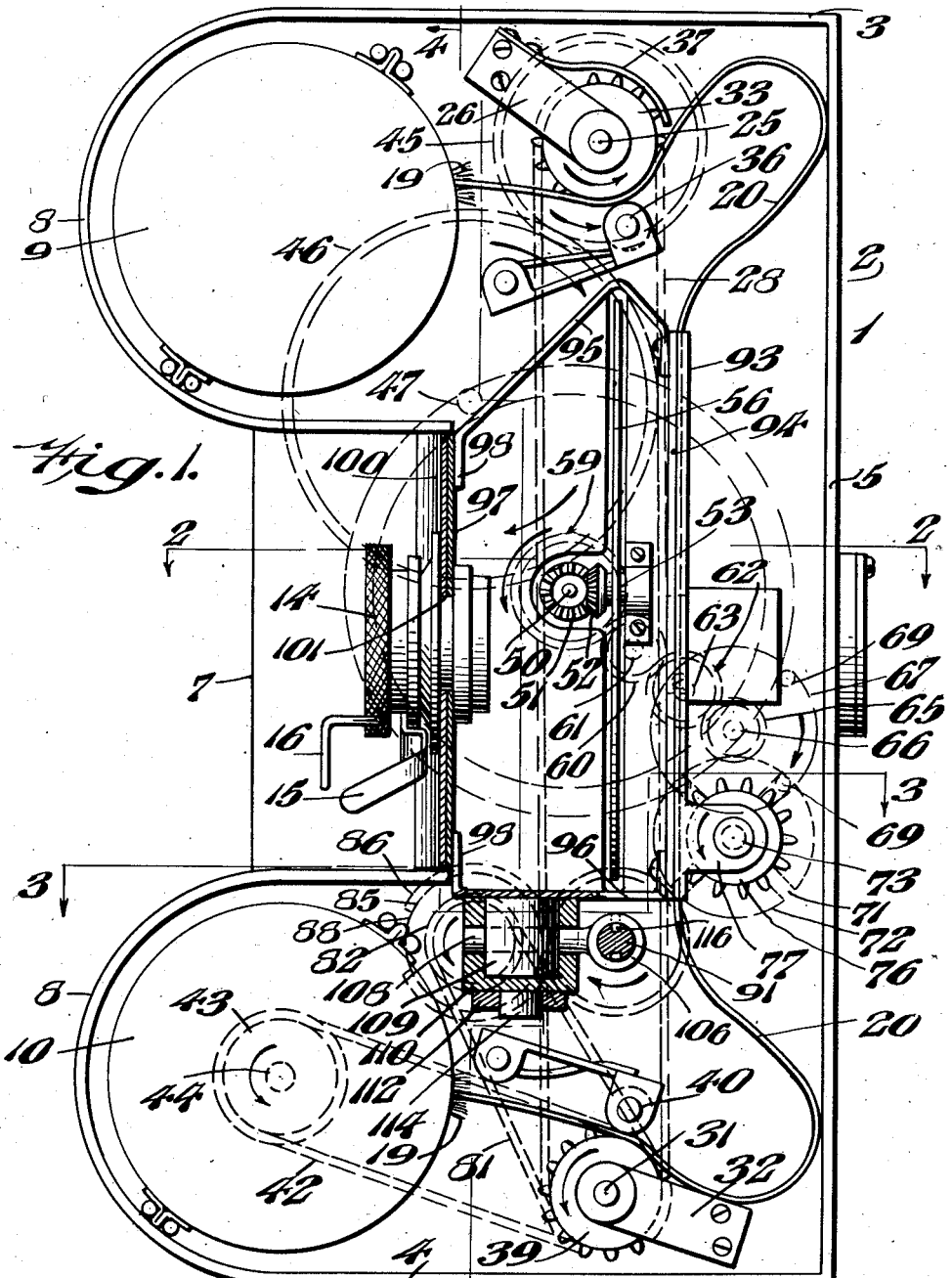
Figure 1 represents a side elevation of a motion picture machine embodying my invention with one side of the casing removed and with certain parts shown in section.
Figure 9 represents a section on line 9—9 of Figure 3.

1 designates my novel motion picture camera, comprising a casing 2, having the top 3, bottom 4, rear wall 5 and side walls 6, the front wall 7 of said casing being rounded as 8 to provide room for the film feed and take up rolls or drums 9 and 10 respectively, commonly known as the magazine. 14 designates a lens provided with the conventional focus and light or lens shutter regulating levers 15 and 16. The drums 9 and 10, are provided with the packing 19 such as velvet or felt, which serves to shut the light from the film 20 as will be understood from Fig. 1.

25 designates a shaft journalled in the bracket 26 and carrying the sprocket wheel 27 over which passes the sprocket chain 28 the outer end 29 of said shaft being adapted to receive and engage the slotted end of a conventional crank (not shown). The sprocket chain 28 also passes over the lower sprocket wheel 30 fast on the shaft 31 journalled in the bracket 32. The shaft 25 carries the sprocket roll 33 which engages the apertures 34 of the film 20 to propel the latter, said roll being provided with the film press roll 36 and the film guard 37.

The shaft 31 also carries the sprocket roll 39 which engages the apertures 34 of the film 20 and which is provided with the press roll 40 as will be understood from Fig. 1. The shaft 31 also carries a pulley 41 over which passes the belt 42 which also passes over the pulley 43 on the shaft 44 to wind the film 20 on the take up drum or roll 10 in the usual manner.

The shaft 25 carries the gear 45 which meshes with the gear 46 on the shaft 47, said gear 46 being in mesh with a pinion 48 on the shaft 50 which carries the bevel pinion 51 which meshes with bevel pinion 52 on the stub shaft 53 to revolve the shutter 56 in synchronism with the movement of the film 20. The shaft 50 the outer end 51 of which is adapted to receive the slotted end of a crank (not shown) also carries the gear 59 which meshes with the pinion 60 on the stub shaft 61 said pinion in turn meshing with the pinion 62 on the shaft 63, which latter pinion is in mesh with the pinion 65 on the shaft 66. The shaft 66 carries the wheel 67 provided with the pins or fingers 69 which engage the slots 71 in the wheel 72 fast on the shaft 73 journalled in the bracket 77. The shaft 73 also carries the sprocket roll 76 which engages the apertures 34 of the film 20 to propel the latter as will be understood from Figures 1 and 3. The shaft 31 also carries a pulley 80 over which passes the belt 81 which also passes over the pulley 82 fast on the shaft 83 which carries the mutilated gear 85, said mutilated gear 85 being provided with the opposite toothed portions 86 and 87 and with the opposite blank portions 88 and 89 and being adapted to mesh with the gear 90 on the shaft 91.

Figure 3:
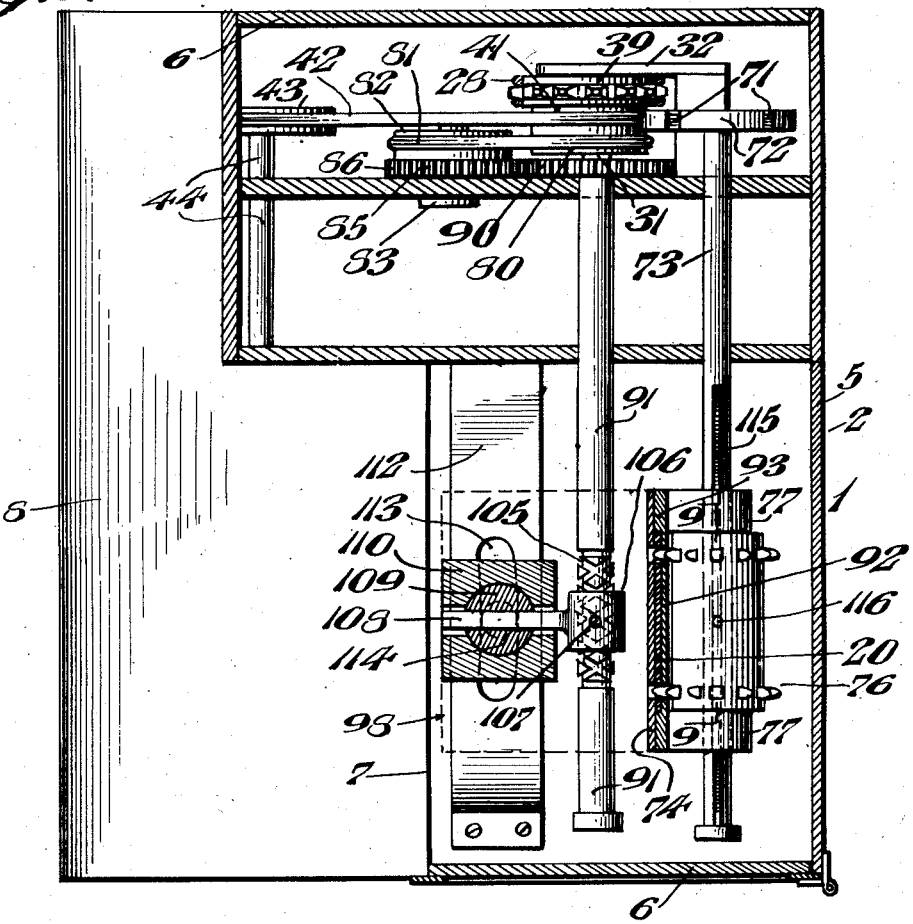
Figure 3 represents a section on line 3—3 of Figure 1, certain parts being shown in elevation.

The bracket 77 in which is journalled the shaft 73 which carries the sprocket roll 76 is rigidly secured to and carried by the rear wall 93 of the exposure or optical chamber of the camera, and which in conjunction with the plate 94 forms a slot 92 through which the film 20 passes as will be understood from Figure 3. 95 and 96 designate the top and bottom of the optical or exposure chamber, said top 95 and bottom 96 being rigidly secured to the rear wall 93 and bracket 75. The lens 14 is rigidly secured to the front wall 97 which in turn is rigidly secured to the front ends of the top 95 and bottom 96 as at 98. 100 designates a front plate secured to the inner edges of the front wall 7 of the casing 2 and to inner edges of the upper and lower drum housings 8 (see Fig. 1) and is provided with a horizontal slot 101, through which the lens 14 is adapted to reciprocate in a manner and for a purpose hereinafter described.

The shaft 91 is provided with the reversible cylinder screw thread 105 which is engaged by the corresponding threaded sleeve 106 having the engaging pin 107, said sleeve carrying the pin or arm 108, which passes through the trunnion 109 having its bearing in the block 110, which is rigidly secured to the bottom 96 of the exposure chamber. 112 designates a plate secured to the bottom 4 of the casing 2 and having the arcuate slot 113 therein, for receiving and engaging the guide pin 114 which is carried by the bottom of the block 110.

Figure 2:
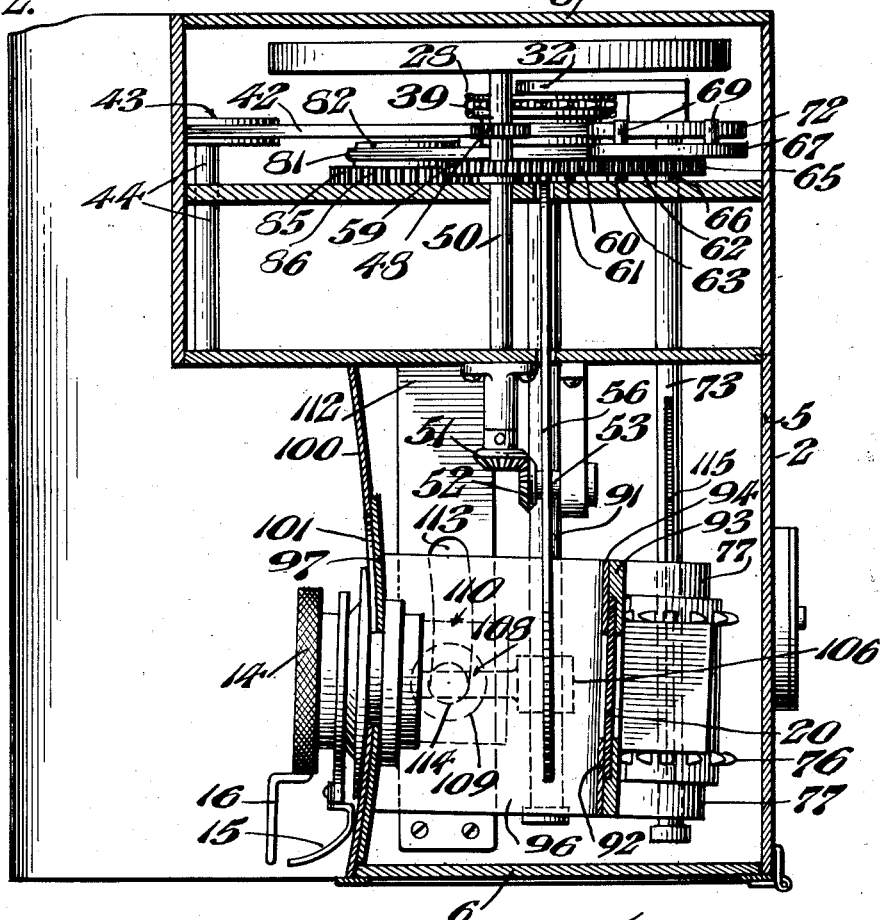
Figure 2 represents a section on line 2—2 of Figure 1, certain parts being shown in elevation.
Figure 5:
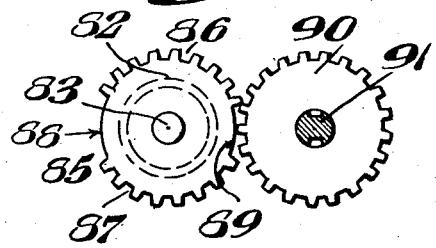
Figure 5 and 6 represent details of constructions.
Figure 6:
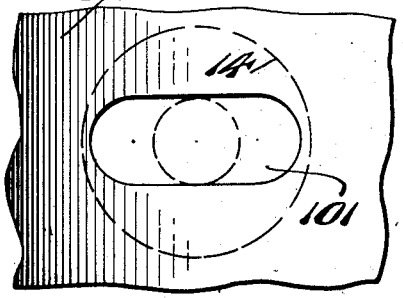

The shaft 73 carrying the sprocket roll 76 is provided with the axial slot 115 which is engaged by the pin 116 to guide said roller along said shaft as will be understood from Figures 2 and 3.

The operation is as follows:—

As the shaft 31 is revolved by the sprocket chain 28 engaging the sprocket wheel 30, the belt 81 engaging the pulley 80 on the shaft 31 and the pulley 82 on the shaft 83, revolves the latter and rotates the mutilated gear 85 which is adapted to engage the gear 90 fast on the shaft 91 to revolve said shaft through an arc of a circle equal to the toothed portion 86 of the gear 85. As the shaft 91 is revolved, the threaded sleeve 106 engaging the reversing cylinder screw thread 105 by the pin 107 moves longitudinally of said shaft, the length of said reversing cylinder screw thread 105 being equivalent to the toothed portion 86 of the mutilated gear 85, so that when the blank portion 88 of said gear is juxtaposed to the gear 90, the shaft 91 is no longer revolved, and the threaded sleeve 106 has reached the extreme end of the screw thread 105. In this position, the sleeve 106 is momentarily retained in its extreme position on the shaft 91 until the mutilated gear 85 shall have been revolved through an arc equal to the blank portion 88, when the gear 90 is again engaged by the toothed portion 87 of the gear 85 and the shaft 91 is again revolved, whereupon the sleeve 106 now moves longitudinally of the shaft 91, but in the opposite direction, until it reaches the opposite extreme end of the reversing screw thread 105, in which position the shaft 91 is again retained momentarily stationary (by the disengagement of the gear 90 from the gear 85) until the mutilated gear 85 shall have been revolved through an arc equal to the blank portion 89, when the gear 90 is again engaged by the toothed portion 86 of the gear 85 further to revolve the shaft 91 and actuate the sleeve 106. In other words, the mutilated gear 85 intermittently actuates the shaft 91, and the reversing cylinder screw thread 105 intermittently actuates the threaded collar or sleeve 106, and imparts a uniform intermittent reciprocatory movement to the pin or arm 108 which egages the block 110 which is in turn, rigidly secured to the bottom 96 of the optical or exposure chamber of the camera thus reciprocating the top and bottom 95 and 96 of the optical chamber the lens 14, the front plate 97, the rear plate 93 carrying the film 20 and the sprocket roll 76, which latter slides on the shaft 73 by engagement of the pin 116 with the guide slot 115 as will be understood from Figure 3.

Figure 4:
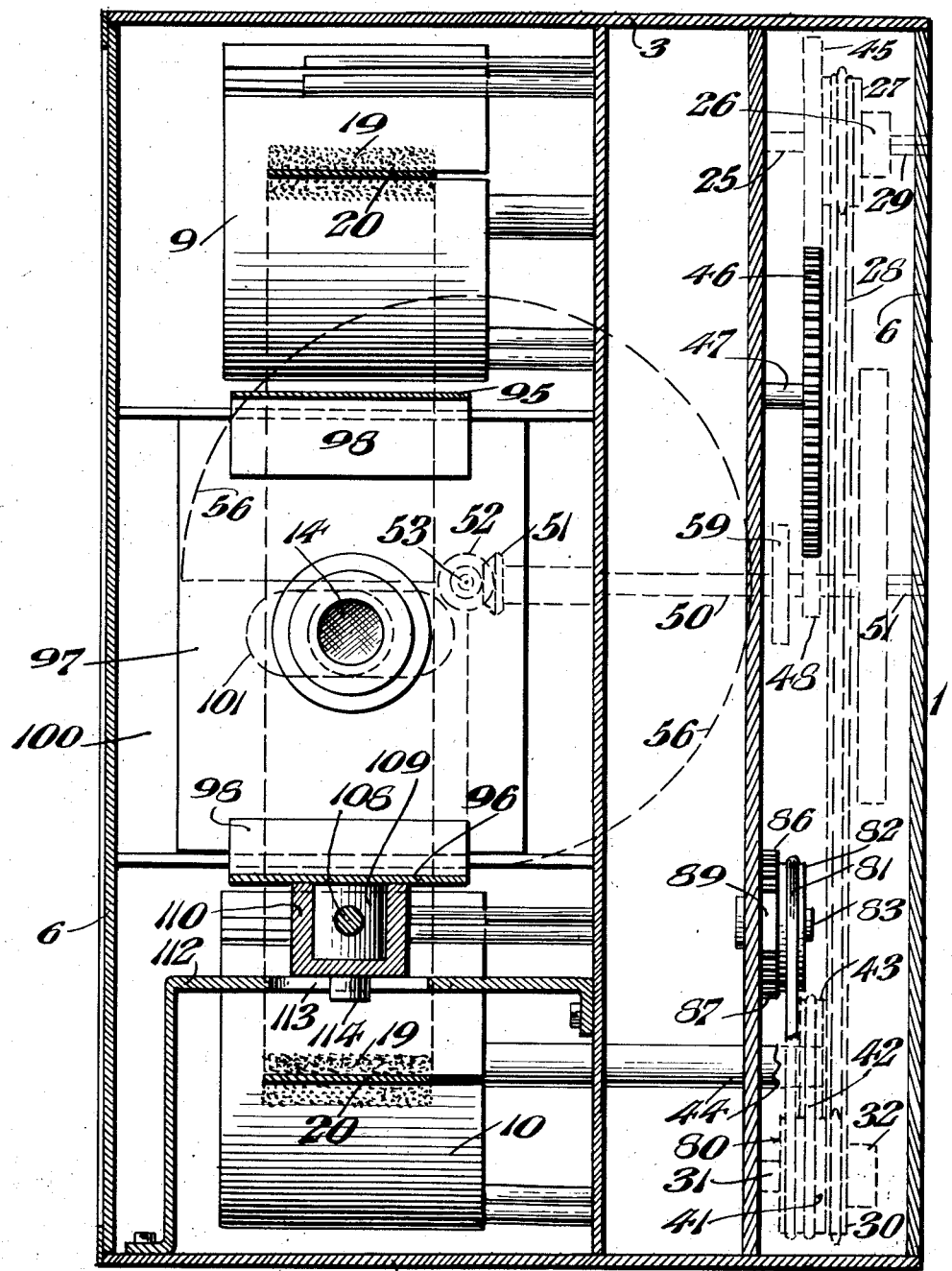
Figure 4 represents a section on line 4—4 of Figure 1, certain parts being shown in elevation.

In order to increase the angular difference and to accentuate the "relief" effect obtained, I reciprocate my lens 14 and film 20 and their adjuncts along a circular path, by the providing of the block 110 with the bottom pin 114 which engages the arcuate slot 113 in the plate 112 so that the reciprocatory movement resulting is not on a straight line, but on an arc of a circle, as will be apparent from Figures 2, 3 and 4.

Referring to Figure 9, it will be seen that the sprocket roll 76 is provided with the flaring through opening 120 which affords play for or permits the tilting of the sprocket roll 76 with respect to the shaft 73 to permit the arcuate reciprocatory movement of the lens 14 and film 20 as above described, and to insure constant alignment and focal registration of the film with said lens.

In order further to permit the reciprocatory movement of the lens, I provide the front wall 100 with the slot 101 and to prevent the entry of light into the exposure chamber, other than through the lens 14, I provide the plate 97, carried by and reciprocating with the lens 14, and overlapping the extremities of the slot 101, thereby to keep the latter closed regardless of the position of the lens 14.

My novel shutter 56 is so shaped, and so timed and synchronized with respect to the travel of the film 20 and movement of the mutilated gear 85 and the revolution of the shaft 91, that the film 20 is only exposed to the light passing through the lens 14, when the sleeve 106 is at either extremity of the cylinder screw thread 105, in which position the shaft 91 is momentarily retained stationary to permit adequate exposure (by the action of the mutilated gear 85 and the gear 90). Thus, in the position of the parts shown in Figure 3, with the lens 14 centrally located, no exposure can take place, since the sleeve 106 is in process of moving along the screw thread 105 and the shutter 56 shields the film 20. When, on the other hand, the sleeve 106 reaches one end of the screw thread 105 and the parts are as shown in Figure 2, and are held stationary by the action of the mutilated gear 85 the shutter 56 no longer shields the film 20 and the latter is exposed. The next exposure takes place when the sleeve 106 has been actuated by the resumed revolution of the shaft 91 and has reached the other opposite end of the screw thread 105, that is, when the parts has assumed an extreme opposite position to that shown in Figure 2, in which position the parts are again momentarily retained stationary while the second exposure is taking place.

Figure 7:
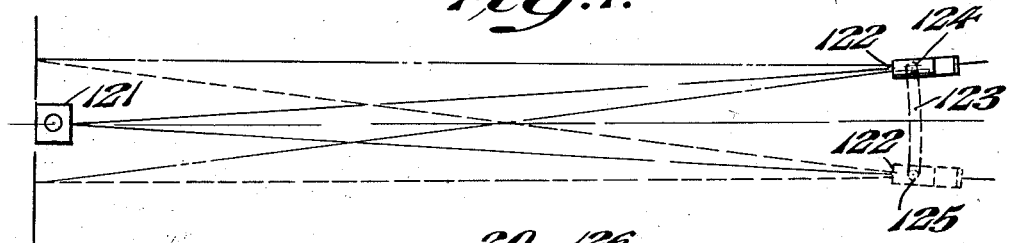
Figure 7 represents a diagrammatic view illustrating the manner of operating my novel device.

Referring to diagrammatic Figure 7, I have shown an object 121, being photographed by a lens 122 (representing the lens 14) which reciprocates along the arcuate path 123 (representing the circular slot 113) and in which exposure is had at the extreme positions or points 124 and 125 at either end of the swing or movement of the lens, it being understood that the lens and corresponding film portion are held stationary while the exposure takes place, by the action of the mutilated gear and reversing screw thread 105 and their adjuncts.

Figure 8:
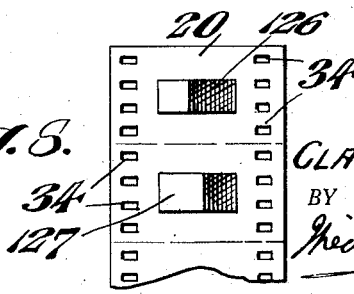
Figure 8 represents a piece of film on which a given object has been photographed in the manner illustrated in Figure 7.

In Figure 8 I have illustrated the pictures resulting from the angular spaced exposures taken in the manner shown in Figure 7, the picture 126 having been taken from the position 124 and the picture 127 having been taken from the position 125, which two pictures, when projected in rapid succession on a conventional screen, produce an optical illusion which makes the object 121 appear in relief or perspective in the desired manner.

It will thus be seen that I have devised a novel motion picture machine wherein the lens is reciprocated in synchronism with the film the latter being exposed to picture a given object from two different angles, and being moved in unison with and in the same plane as said lens to maintain accurate focal alignment and registration of said film with said lens.

It will further be seen that I have devised an extremely novel and simple construction, wherein the movement of the lens and film is effected by the conventional driving mechanism, such as the crank handle for winding the film, without any increase in the size of the machine, and without materially adding to the cost of manufacture.

Having thus described my invention, what I claim is new and desire to secure by Letters Patent, is:—

1. In a motion picture camera, a casing, an optical chamber within said casing, a lens carried by said optical chamber and projecting through the front of said casing, a film carried by the rear of said optical chamber, a driving mechanism for said film, a plate in the bottom of said casing below said optical chamber and having an arcuate slot therein, a guide pin carried by the bottom of said chamber and engaging said slot, and means connected to said pin and actuated by said film driving mechanism for intermittently reciprocating said optical chamber, lens, and film synchronously and as a unit.

2. In a motion picture camera, a casing, an optical chamber within said casing, a lens carried by said optical chamber and projecting through the front of said casing, a film carried by the rear of said optical chamber, a driving mechanism for said film, a plate in the bottom of said casing below said optical chamber and having an arcuate slot therein, a guide pin carried by the bottom of said chamber and engaging said slot, means connected to said pin and actuated by said film driving mechanism for intermittently reciprocating said optical chamber, lens and films synchronously and as a unit, means for rendering said optical chamber, lens and film momentarily stationary, and means for preventing the exposure of said film except when said optical chamber, film and lens are stationary.

3. In a motion picture camera, a casing, an optical chamber within said casing, a lens carried by said optical chamber and projecting through the front of said casing, a film carried by the rear of said optical chamber, a driving mechanism for said film, a plate in the bottom of said casing having an arcuate guide slot therein, a guide pin rigidly carried by the bottom of said chamber and engaging said slot, means connected to said pin and actuated by said film driving mechanism for reciprocating said lens and film in parallel, curvilinear planes, there being a slot in the front of said casing for guiding said lens, and a shield carried by said lens within said optical chamber adapted to overlap said guide slot to prevent the entry of light into said optical chamber other than through said lens.

CLAYTON WILLIAMS.